Dec. 12, 1944.   O. STORZ   2,364,878
PLOWING DEVICE
Filed March 30, 1942   2 Sheets-Sheet 1

Inventor:
Otto Storz

Dec. 12, 1944.    O. STORZ    2,364,878
PLOWING DEVICE
Filed March 30, 1942    2 Sheets-Sheet 2
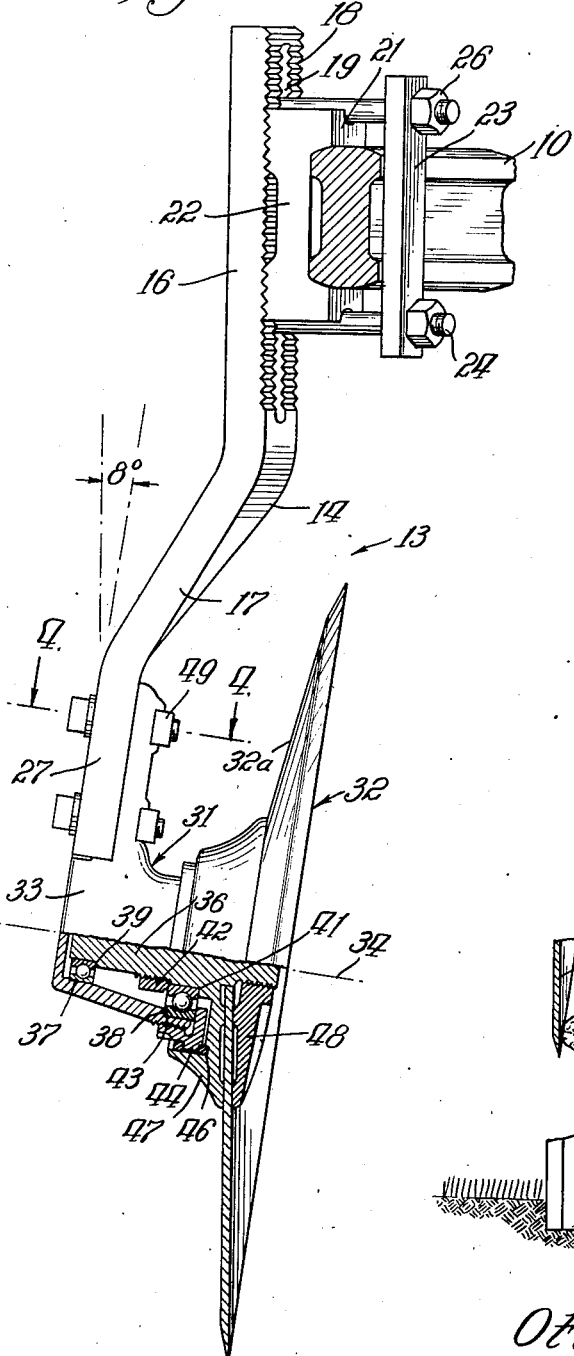
Inventor:
Otto Storz
By Foorman L. Mueller Atty.

Patented Dec. 12, 1944

2,364,878

UNITED STATES PATENT OFFICE 2,364,878

PLOWING DEVICE

Otto Storz, Valparaiso, Ind., assignor to McGill Manufacturing Company, Valparaiso, Ind., a corporation of Indiana Application March 30, 1942, Serial No. 436,777

3 Claims. (Cl. 97—211)

This invention relates generally to plowing devices and in particular to a plowing device having a plow member operating in conjunction with a colter unit.

It is an object of this invention to provide an improved plowing device.

It is another object of this invention to provide means for adjustably supporting a colter so that it may be run at any desired angle to the line of draft.

Another object of this invention is to provide a plow and a colter unit arranged in relative operating positions and so constructed that the colter disc functions to cut a straight furrow wall while turning over a portion of the turf in the same direction as the plow so that trash and the like is initially moved to one side of the plow and out of its path of travel, whereby to completely eliminate all clogging difficulties.

It is another object of this invention to provide a colter construction such that the colter disc operates both to cut and partially turn over a portion of the turf without in any way increasing the side draft of the plowing device with which it is utilized.

A further object of this invention is to provide a colter unit for a plow having a colter disc arranged and constructed to cut a new furrow wall which is in alignment with the wall cut by the plow.

A particular feature of this invention is found in the provision of a colter unit having adjustable means for varying the depth and angle of cut of the colter disc, with such means being adapted for independent adjustment.

Yet another feature of this invention is found in the provision of a colter unit having a colter disc set in a predetermined operating relation with respect to the plow member, and in which means are provided to vary the angle of cutting of the disc without substantially altering such predetermined operating relation.

Further objects, features and advantages of this invention will become apparent from the following description when taken in connection with the accompanying drawings in which:

Fig. 3 is an elevational view partly in section showing the complete assembly of the colter unit of this invention;

Fig. 4 is a transverse sectional view taken along the line 4—4 in Fig. 3;

Fig. 5 illustrates diagrammatically one operating position of the colter disc relative to the ground being cut;

Fig. 6 illustrates diagrammatically the manner in which a portion of the turf is initially folded back by the colter disc; and Fig. 7 illustrates diagrammatically the complete turning over of the turf by the plow member.

Figure 1:
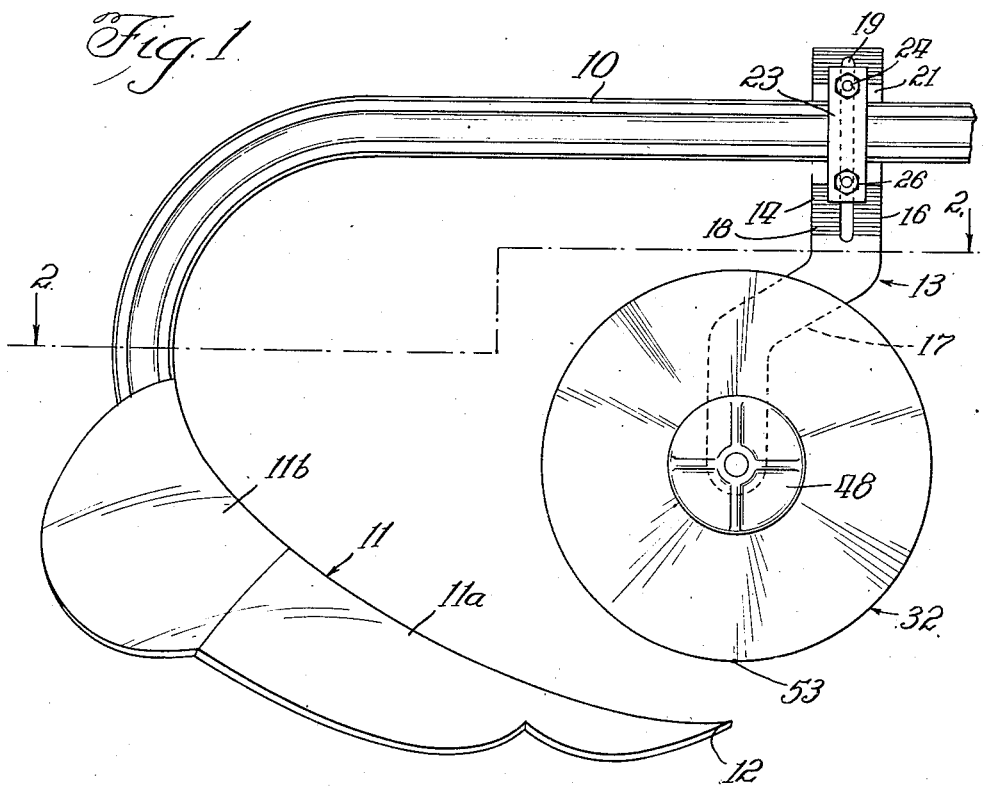
Fig. 1 is a fragmentary elevational view of a plowing device showing the assembly therein of a plow member and colter unit in accordance with this invention.

Referring to the drawings there is shown in Fig. 1 a supporting beam 10 for a plow member 11 including a share 11a and mold board 11b, a leading or plow point for the share being indicated at 12. The colter unit, designated generally as 13, includes a colter shank or standards 14 having a vertical portion 16 and an angulate portion 17.

The vertical portion 16 (Fig. 3) is formed with a plurality of serrations 18 on one side thereof and has a slot 19 extending therethrough and terminating in the serrated side. A clamping block 21 of substantially U-shape has the leg portions thereof positioned about the plow beam 10 and is provided on the outside of the connecting portion 22 thereof with serrations corresponding to the serrations on the shank member 14. A clamping plate 23 is positioned against the plow beam 10 opposite to the block member 22 and is adapted to receive a pair of clamping bolts 24 extended through the slot 19 in the vertical portion 16 of the colter shank 14. It is thus obvious from Fig. 3 that on tightening of the nuts 26 for the bolts 24, the colter shank 14, clamping block 21 and clamping plate 23 are all clamped together in fixed positions on the plow beam 10. On releasing the nuts 26 to provide a clearance between the engageable serrated surfaces, the colter shank 14 is capable of being vertically moved to any adjusted position to vary the depth of cut for the dish-shaped colter disc 32, to be later explained.

The angulate portion 17 of the colter shank 14 (Figs. 1 and 3) extends both laterally and downwardly from the vertical portion 16 and in a direction rearwardly thereof toward the plow member 11. The portion 17 is suitably bent or twisted so that the end section 27 thereof is of straight form but inclined at an angle relative to the vertical section 16. In one commercial embodiment of the invention an angle of 8° is used, this angle being indicated in Fig. 3. The end section 27 (Fig. 4) is formed with a concavely curved portion having serrations 28 thereon for mating engagement with a convexly curved serrated portion 29 formed as a part of a bearing unit, indicated generally as 31, for rotatably supporting the colter disc 32. The serrated portion 29 of the bearing unit 31 is integrally formed as a part of a housing member 33 the body portion of which is at substantially right angles to the portion 29. By virtue of the 8° inclination of the portion 27 from a vertical plane and the mating engagement of the curved serrated portions or mating faces 28 and 29 the axis of rotation for the disc 32, shown at 34 (Fig. 3) is substantially normal to the plane of the end section 27 and thus inclined relative to a horizontally extending plane.

The bearing unit 31 (Fig. 3) includes the housing member 33 previously mentioned, in which is rotatably supported a hub member 36 for the disc 32. The hub portion 36 is rotatably supported in the housing member 33 by bearing means 37 and 38. The bearing 37 is retained in a fixed position axially of the hub member 36 by engagement with a shoulder portion 39 formed in the hub member. The inner race ring of the bearing means 38 is held in a fixed position on the hub 36 between a stop or shoulder 41 and a tightening nut or collar 42. The bearing 38 is utilized to retain the hub 36 within the housing 33 by the clamping of the outer race ring thereof between a shoulder 43 formed in the housing member 33 and a clamping collar 44 threaded on the housing member 33. The bearings 37 and 38 are sealed from moisture and dirt by sealing rings 46 held in place against the tightening collar 44 by an annular flange portion 47 formed integrally with the hub portion 36.

The hub portion 36 is assembled within the housing 33 with the bearings 37 and 38 in assembly position thereon and while the clamping collar 44 is retained within the flange portion 47. This hub assembly is inserted within the open end of the housing member 31 with the bearing 38 positioned against the shoulder 43. The collar 44 is then threaded onto the housing 33 to its position indicated in Fig. 3. The disc 32 is positioned about the hub portion 36 and against the flange 47 and is clamped in this position by a holding nut 48 which is threadable on the hub 36. From a consideration of Fig. 3, therefore, it is seen that the bearing unit 31 is of a construction such that dirt and moisture is positively prevented from entering therein. It is to be noted further that the disc 32 is supported near one end of the bearing unit 31 with the side portions 32a thereof extending outwardly or away from the bearing unit 31. Thus in operation any dirt carried by the disc falls clear of the bearing unit 31. In the assembly of the unit all parts are suitably greased so as to provide proper lubrication for the life of the unit. Servicing and maintenance of the unit 31 is thus reduced to a minimum.

Since the bearing unit 31, including the disc 32 is movable as a unit any movement between the portions 27 and 29 correspondingly moves the entire bearing unit 31 whereby to provide for the adjustment of the cutting angle of the disc 32 as will be later noted. This adjusted position is retained by clamping bolts 49 extended through corresponding openings 51 in the colter shank 14 and through a slot 52 in the serrated portion 29.

Figure 2:
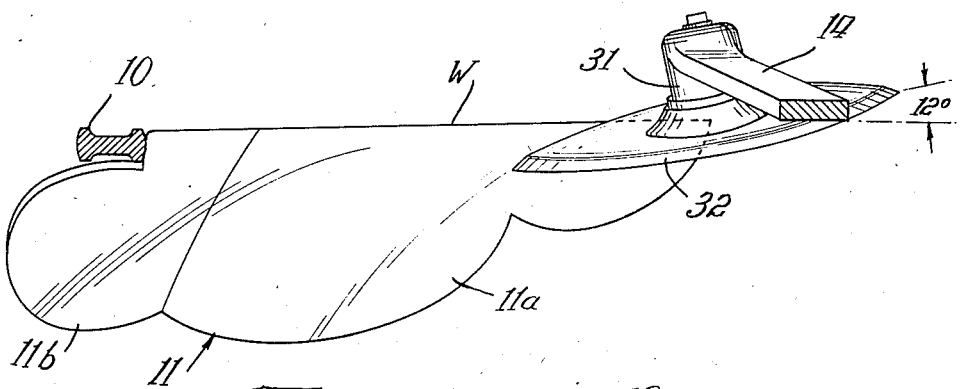
Fig. 2 is a plan view partly in section as seen along the line 2—2 of Fig. 1.

In the operation of this invention it has been found that very desirable results are obtained when the lower most peripheral point of the disc 32, indicated at 53, is adjusted so as to be about three inches above the plow point 12 (Fig. 1) and about one and one-half inches to the outside of the plow point 12 (Fig. 2). The disc 32 is shown in Fig. 2 for one condition of cutting so as to rotate in a plane which is at an angle of about twelve degrees to the plane of the furrow wall being cut and designated as w. As previously mentioned the axis 34 for disc 32 is inclined to the horizontal by virtue of the connection of the bearing unit 31 with the inclined end section 27 of the colter shank 14. With the parts thus relatively arranged the disc 32 is rotated in a plane transversely, or at an angle, relative to the furrow wall w so that instead of being merely rolled along the ground there is provided a cutting or shearing action with the ground which results in the furrow wall w being cut cleanly and in a substantially vertical direction.

Because of the conical construction and angular setting of the disc 32 it also functions to initially turn over a small portion of the turf which is again turned over by the following action of the plow 11. It is well known in the operation of plows and discs that a side draft or thrust is produced on these parts which acts in a direction opposite to the direction in which the dirt or turf is being turned. To reduce the side draft on the disc 32 to a minimum the radial portions 32a thereof are of straight form so that the disc 32 enters the ground freely regardless of the depth at which it is operating. Any side thrust produced is thus the result only of the dirt being thrown and not from the forcing of the cutter into the ground as occurs with discs of rounded contour. This side draft or thrust from the disc 32 is counter-acted directly by the bearing of the rear portion 54 of the disc 32 against the cut furrow wall. This is best illustrated in Fig. 5 in which the rear portion 54 of the disc bearing against the cut furrow wall w is shaded. The operation of the disc 32, therefore, does not in any way disturb the balanced thrust conditions provided in the plowing device alone. The colter unit of this invention may thus be applied to any plowing device, whether of tractor or horse drawn type, without producing any additional side thrust therein.

The initial turning over of the turf by the disc 32 is illustrated diagrammatically in Fig. 6, that portion of the turf turned over by the disc being indicated as 56. In the prior art devices the colter disc merely functions to cut through sod and trash without turning over any portion thereof. The sod at the cutting or furrow line therefore is not completely covered by the turf turned over by the plow so that a grass line results, this grass continuing to grow when plowing is completed. Further the trash cut by these prior art colter discs is not initially moved from the path of the plow share. As a result it accumulates between the plow and the colter so that considerable inconvenience is encountered in frequent stopping to free the plow of this trash. With the colter of this invention the sod initially turned thereby is completely covered by the turf turned over by the plow, as shown in Fig. 7, so that the grass lines above noted are completely eliminated. The colter operates to fold or turn over a small portion of the turf and to produce a clean cut furrow wall by a cutting or shearing action, which provides further for a complete cutting of all sod, weeds or corn stalks which might otherwise be pulled up by the plow and left unburied. The cutting of all this material and its initial moving by the disc to a position for complete burial under the turf turned over by the plow is of extreme importance in preserving the humus in the soil which is vital in the healthy growth of crops. Where this trash material is left on the top of the ground, as occurs with the prior art devices, it does not rot within the soil so that its value as a fertilizer is entirely lost. With one embodiment of the invention used in the plowing of a field thickly covered with horse weed about ten feet high, all of this weed was completely buried so that the field was clean and ready to seed. In many instances where the field is so covered with weed, the weed is first burned off so as to save time in plowing. This procedure of course is wasteful both in time and in the loss of the weed as a fertilizer.

By virtue of the shearing action of the disc 32 all of the trash is cut into pieces so that it is not readily carried on the disc. However, since the disc 32 is inclined with the rear portion thereof to one side of the plow 11 any trash which might be picked up by the disc is carried by the disc out of the path of travel of the plow so that the accumulation of trash either on the colter, on the plow, or in the space intermediate the colter and the plow is completely eliminated. Any trash carried by the disc is thrown to one side of the plow and buried under the soil turned over thereby.

As was previously mentioned the plow point 12 is set at a distance of about one and one-half inches to the outside or laterally away from the lowermost peripheral point 53 of the disc 32. In other words the plow point 12 is not in a following relation immediately below the furrow line or wall w cut by the disc 32 but is spaced outwardly from such wall. Although the plow point is not in a straight line following relation with the peripheral point 53, because of the shape of the plow share the finished furrow wall is cut substantially straight over its entire height. This arrangement of the plow point 12 relative to the disc point 53 provides for a more thorough scouring action of the plow by the dirt since the dirt tends to progressively scour the plow as it passes along the plow rather than to be immediately turned over thereby. Furthermore, the traveling of the plow point 12 outwardly of the furrow wall w tends to throw the dirt to both sides of the plow point with the dirt between the plow point and the furrow wall moving upwardly along the plow and for an appreciable distance over the mold board 11b thereof so as to completely scour the same. In contrast to this condition, colters of the prior art normally act in such a way as to rob the plow of dirt for necessary scouring, and in time this causes clogging of the plow and inefficient as well as imperfect plowing.

The depth at which the disc 32 is permitted to cut is adjustable at relatively fine increments by moving the serrated portion on the vertical end 16 of the colter shank 14 relative to the corresponding serrated portion on the clamping block 22. This is readily accomplished by merely loosening the nuts 26 to disengage previously engaged serrations and then moving the shank portion to a desired position. Any depth of cut for the disc 32 is thus simply accomplished. The cutting depth of the disc 32, of course, is governed by the total depth of the furrow desired. For example if the furrow is to be six inches deep then the disc 32 is adjusted to make a cut of about three to four inches so that a vertical space of two or three inches is left between the plow tip 12 and the peripheral point 53 of the disc.

Depending upon the particular plowing conditions the disc 32 may be angularly inclined relative to the furrow wall to cut at any desired angle. In order to set the cutting angle of the disc 32 the nuts 50 for the bolts 49 are loosened to permit movement of the curved serrated portion 29 relative to the mating curved portion 28, the movement of the portion 29 in turn providing for the movement of bearing unit 31 and hence of the disc 32. The serrations may be made relatively small so that small increment changes can be made over a wide angular range.

The curvature of the curved portions 28 and 29 has for a radius a distance A—B extending axially of the axis of rotation 34 of the disc 32 (Fig. 4). Thus on pivotal or rotational movement of the bearing unit 31 relative to the inclined end section 27, the axial center of the disc 32 and hence the lower most peripheral portion 53 thereof is moved through an arc limited by the range of adjustment between the serrated portions 28 and 29. The center of the arc is defined by the position of the disc 32 when it is in a plane substantially parallel with the plane of the end section 27. The distance of the disc point 53 laterally of the plow point 12 thus remains substantially unchanged for all angular cutting positions of the disc 32. The angular setting of the disc 32 may thus be accomplished independently of the setting of the disc 32 relative to the plow point 12.

From a consideration of the above description and drawings it is seen that the invention provides a colter for a plowing device having adjustable mounting means for setting it in a predetermined operating relation with an associated plow member. The colter disc or cutting blade is of a construction and arrangement relative to the plow such that it functions to provide a clean cut furrow wall by a cutting or shearing action rather than by a mere rolling action thereof. Although the disc functions to initially turn over a small portion of the turf, the turf thus folded is of such a small volume that it does not in any way interfere with the volume of the turf being passed over the mold board of the plow for scouring the same. All of the adjustments to the colter unit can be made simply, quickly and independently of each other and in accordance with the plowing conditions being encountered.

Although the invention has been described with reference to but a single plow and colter combination it is to be understood that any number of such combinations may be used in a single plowing device. It is to be understood further that although the invention has been described with specific reference to a single embodiment thereof it is not to be so limited since modifications and alterations can be made in the various parts and in their relative arrangement which are within the scope of this invention as defined by the appended claims.

I claim:

1. In a plowing device for attachment to a plow beam, comprising a dish-shaped colter disc having radiating portions extending straight away from the center of the disc to the cutting edge thereof, supporting means for supporting said disc from said beam with the portion of the disc which connects the center of the disc with the lowermost point of said cutting edge being substantially vertical, and means included in said supporting means for adjustably pivoting said disc to change the cutting angle thereof and for maintaining the substantially vertical relationship for said portion of said disc regardless of the cutting angle imparted to said disc, said lastnamed means including a pair of relatively adjustable members provided with curved portions having mating serrations which extend longitudinally in upright positions and at an angle relative to the vertical to permit adjustment of the cutting angle of said disc without altering the substantially vertical relationship for said portion of said disc.

2. A colter unit for a plowing device having a plow beam, said colter unit including a colter disc, a colter shank adapted for attachment to said plow beam and having a curved upright extending serrated face portion, a bearing unit rotatably supporting said disc and including a housing member provided with a curved serrated face portion likewise extending upwardly and adapted for overlapping mating engagement in an upright direction with the upright extending serrated face portion of said shank, a hub member for said disc rotatable within said housing member, means retaining said hub member in said housing member, a pair of vertically spaced bolts for clamping said two serrated portions together, with relative movement between said two serrated portions moving said bearing unit relative to said colter shank to adjust the cutting angle of said disc, and means for so attaching said colter shank to said plow beam that the cutting angle of said disc relative to the vertical cannot be changed by clamping said serrated face portions in different relative positions.

3. In a plowing device for attachment to a plow beam comprising a rotatable dish-shaped colter disc, the radiating portions of said disc extending straight away from the center of the disc to the cutting edge thereof with the portion of the disc which connects the center of the disc with the lowermost point of said cutting edge adapted to stand substantially vertical, a support for the disc for mounting on the plow beam to adjustably raise and lower said disc on the plow beam, and means included in said support for adjustably pivoting said disc about an axis which is substantially parallel with a line extending from the center of said disc to the uppermost point of the cutting edge thereof so that the disc may be pivoted to various horizontal angular positions without disturbing the upright angular position, said means comprising a pair of upright parts having corresponding upright mating faces, and substantially horizontally extending clamping means extending through said parts.

OTTO STORZ.